US011500641B2

(12) United States Patent
Abdelhafez et al.

(10) Patent No.: US 11,500,641 B2
(45) Date of Patent: Nov. 15, 2022

(54) DEVICES, METHODS, AND MEDIA FOR EFFICIENT DATA DEPENDENCY MANAGEMENT FOR IN-ORDER ISSUE PROCESSORS

(71) Applicants: Hazem A. Abdelhafez, Vancouver (CA); Ning Xie, Newmarket (CA); Ahmed Mohammed ElShafiey Mohammed Eltantawy, Markham (CA)

(72) Inventors: Hazem A. Abdelhafez, Vancouver (CA); Ning Xie, Newmarket (CA); Ahmed Mohammed ElShafiey Mohammed Eltantawy, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/065,501

(22) Filed: Oct. 7, 2020

(65) Prior Publication Data
US 2022/0107811 A1    Apr. 7, 2022

(51) Int. Cl.
*G06F 9/38* (2018.01)
*G06F 9/30* (2018.01)
*G06F 8/41* (2018.01)

(52) U.S. Cl.
CPC .............. *G06F 9/3836* (2013.01); *G06F 8/41* (2013.01); *G06F 9/30043* (2013.01)

(58) Field of Classification Search
CPC ................................. G06F 9/3836; G06F 8/41
See application file for complete search history.

(56) References Cited

U.S. PATENT DOCUMENTS

| | | | |
|---|---|---|---|
| 7,200,737 B1 * | 4/2007 | Merchant ................ | G06F 9/383 712/218 |
| 2005/0251666 A1 | 11/2005 | Chaudhry et al. | |
| 2011/0072239 A1 * | 3/2011 | Burger .................. | G06F 9/3824 712/E9.002 |
| 2015/0128113 A1 | 5/2015 | Skoglund et al. | |
| 2016/0306772 A1 * | 10/2016 | Burger .................. | G06F 9/5038 |
| 2019/0138492 A1 * | 5/2019 | Dobbs .................... | H04L 45/745 |
| 2020/0310815 A1 | 10/2020 | Ayupov et al. | |

* cited by examiner

Primary Examiner — Michael J Metzger

(57) ABSTRACT

Methods, devices and media for efficient data dependency management for in-order issue processors are described. In various embodiments described herein, methods, devices and media are disclosed that provide techniques for managing RAW data dependencies between instructions in a constrained hardware environment. The described techniques include initial wait station allocation of write instructions, followed by wait station allocation conflict resolution methods that use a greedy algorithm to optimize a cost function based on the estimated latency of a single instruction. Efficient compilation and reduced execution time may be achieved in some embodiments. Methods and devices for compiling source code are described, as well as devices for executing the compiled machine code and media for storing compiled machine code.

20 Claims, 10 Drawing Sheets

```
Allocate(InstructionList, WSList):
    for instruction in InstructionList:
        if instruction is Producer:
            HandleProducer(instruction, WSList)
        elif instruction is Consumer:
            HandleConsumer(instruction, WSList)
        else:
            continue

# Clear any pending producer on the WSs
    cleanUp(WSList)
```
502

```
HandleProducer(producer, WSList):
    target_ws = leastOccupied(WSList)
    if target_ws.full():
        # We need to clear the WS that has the
        # most number of producers that are done
        target_ws = getEarliestToFinish(WSList)

InsertConsumer(newConsumer, WSList)

# Now we can clear the target WS an
    # insert the producer
    clear(target_ws)

target_ws.insert(producer)
```
504

```
HandleConsumer(consumer, WSList):
    # Get the WS on which this consumer's producer is waiting.
    associatedWS = getAssociatedWS(consumer, WSList)

if associatedWS is None:
        consumer.waitsFor = []
    else:
        # Construct a list of all in-flight producers in associatedWS
        # whose estimated latency is higher than the current consumer's
        # producer
        longerProducersList = getLongerProducers(associatedWS)

# Construct a list of all in-flight producers in the rest of
        # the WSList whose estimated latency is lower than the current
        # consumer's producer
        shorterProducersList = getShorterProducers(associatedWS)

# Try to re-allocate the longer producers to any other available
        # WS, if they are all full, then try to swap them with a shorter
        # producer
        for lp in longerProducersList:
            if canReallocate(lp):
                associatedWS.remove(lp)
            else:
                swapAny(lp, shorterProducersList)

# If all long producers are re-allocated, fill the associatedWS
        # with shorter producers who will finish anyway before the current
        # consumer's producer
        while associatedWS is not Full:
            while shorterProducersList is not empty:
                move(shorterProducersList[0], associatedWS)
                shorterProducersList.remove(0)

# Update the dependencies list of this consumer
        consumer.waitsFor = associatedWS.getProducers()

# Clear the associatedWS
    clear(associatedWS)
```
506

FIG. 5

DEVICES, METHODS, AND MEDIA FOR EFFICIENT DATA DEPENDENCY MANAGEMENT FOR IN-ORDER ISSUE PROCESSORS

RELATED APPLICATIONS

This is the first patent application related to this matter.

FIELD

The present disclosure is related to methods, devices and media for data dependency management, and in particular to methods, devices and media for efficient data dependency management for in-order issue processors.

BACKGROUND

Digital computers include different components of hardware (e.g., processor devices such as central processing units (CPUs) and graphics processing units (GPUs), memory, and input/output (IO) devices) and software that interact together to implement high-level functionality specified by programmers. Programmers write human-readable software source code specifying this functionality. Due in part to the complexity of this interaction between the different organizations and structures of the underlying hardware (e.g., processors' architectures, Instruction Set Architecture (ISA), features, etc.) and the target software applications, compilers have been introduced as an intermediary agent between software and hardware.

On a high level, a compiler is special purpose software module that transforms computer program source code written in a high-level and generic human-readable programming language (e.g., C++), to a machine specific code (referred to as "machine code"). The machine code generated by a compiler is compatible with the underlying hardware ISA and features, and is ideally highly optimized and efficient (i.e., makes the best use out of the available hardware resources). The operation of a compiler generating machine code from source code takes place at "compile time" or during "compilation"; execution of the compiled machine code by a processor device takes place at "run time".

As used herein, the term "compiler" generally refers to software that carries out all stages of the compilation process for transforming source code into machine code, including preprocessing of source code, compilation per se of the preprocessed source code, assembly, and linking. Whereas the term "compiler" is sometimes understood to refer to the software that only performs the second of these stages (compilation per se), as used herein the term may refer to the software that performs all four stages.

Source code may be pre-processed by the compiler to derive a sequence of instructions prior to those instructions being compiled into machine code. Each instruction specifies a certain operation (e.g., addition) to be performed by the underlying hardware units (e.g., a processor device). In computers using processor devices capable of parallel execution of instructions, one task a compiler needs to perform is the scheduling of sequential instructions from the source code for simultaneous execution by parallel processing units of the processor device. This scheduling task may be performed by a sub-module of the compiler called a scheduler. In highly parallel processor devices, scheduling can be a difficult problem to solve due to the existence of data dependencies between different instructions in a sequence of instructions.

For the purpose of this disclosure, instructions may be characterized as write instructions (also called producers (P) or simply writes), read instructions (also called consumers (C) or simply reads), or dummies (D). A write instruction executes an operation and produces output data that is written to a register. The output data can be read and used by read instructions (i.e., consumers). The order of execution of read and write instructions is critical to scheduling: for example, if a read instruction is positioned after a write instruction in the sequence of instructions, and both instructions specify the same register, then the write instruction must complete execution before the read instruction in order for the result of the read instruction to be correct. Hence, read instructions have data dependencies on write instructions. This type of dependency is called Read-After-Write (RAW), true dependency, or flow dependency. There are other types of instruction dependencies, such as Write-After-Write (WAW) and Write-After-Read (WAR), but these can typically be addressed using renaming techniques and are out of scope of this disclosure. Thus, when instruction dependencies are referred to in this disclosure, it will be appreciated that the type of dependency referred to is RAW. The term "dependency", as used herein, can either refer to the relationship between two instructions, or to a write instruction upon which a read instruction (the "dependent" instruction) depends. Thus, a read instruction may be said to have a "dependency" upon, or be "dependent" upon, a write instruction, in which case the write instruction is a "dependency" of the read instruction, and the read instruction is a "dependent" of the write instruction.

RAW dependencies require that the hardware tracks all the dependencies in the source code for a program to make sure that read instructions don't begin executing until their dependencies have concluded their work and produced the data needed by the read instructions (i.e., the dependencies have completed execution). An instruction begins execution when it is "issued" to the processor device. When the hardware detects a RAW dependency, it delays the issuance of the dependent read instruction until its data is ready. This is referred to as a "stall" (i.e., a dependent read instruction "stalls" until its write instruction dependencies have completed execution). These stalls may have a significant impact on the end-to-end execution time of a given program, especially for in-order issue processor devices. An in-order issue processor device is a processor device wherein instructions must be issued in sequential order: instruction i+1 cannot be issued before instruction i. In-order issue processors, such as most modern graphics processor units (GPUs), are defined in contrast to out-of-order issue processors, such as many modern central processing units (CPUs), which can perform dynamic execution to execute instructions in a different order from their original order within a software program. A device capable of operating as an in-order issue processor in an in-order mode for operations requiring in-order issuance of instructions, or as an out-of-order issue processor in an out-of-order mode for performing operations for which in-order issuance of instructions is not required, may be considered to be an in-order issue processor when it is operating in the in-order mode.

In CPUs, RAW dependencies are usually handled by the hardware. Because CPUs typically include a limited number of registers to which data is written, the hardware can track all registers without undue overhead. Moreover, in modern super-scalar CPUs, instructions can be executed out-oforder; hence, a read instruction stalling (i.e., waiting for its write instruction dependencies to finish execution) doesn't delay the subsequent instructions in the sequence, because they can be issued if they are totally independent of the stalling read instruction.

In highly-parallel processor devices such as GPUs and similar hardware accelerators, the number of available registers (i.e., the register file) is usually very large. This limits the ability of the hardware to track all these registers to manage RAW dependencies. Furthermore, GPUs are typically in-order issue processor devices that issue instructions in order; therefore, stalls accumulate across the sequence of executing instructions. This problem is exacerbated for long-latency write instructions.

Thus, there is a need for compilers that can efficiently optimize the management of RAW dependencies in scheduling the issuance of instructions for in-order issue processor devices such as GPUs.

SUMMARY

In various embodiments described herein, methods, devices and media are disclosed that provide efficient data dependency management for in-order issue processors. Examples described herein may provide techniques for managing RAW data dependencies between instructions in a constrained hardware environment. In particular, the described techniques may exhibit particular advantages in environments or domains governed by five constraints: first, the processor device has a limited number of wait stations (as described below) for queueing pending instructions (e.g., three wait stations); second, each wait station has a limited capacity; third, the processor device requires instructions to be issued in order; fourth, the source code contains write instructions that have variable latency (which is unknown at compile time and is not known until run time); and fifth, compilation time is limited (making a brute-force approach to optimization impracticable).

Various embodiments are disclosed that seek to compile machine code such that end-to-end execution time (i.e., total latency) of the compiled machine code is minimized when executed by an in-order issue processor device. To accomplish this goal, some embodiments may use a greedy algorithm to optimize a cost function applied to a single instruction based on the current state of the system (i.e., which instructions are currently allocated to which wait stations). Using a greedy algorithm to optimize a cost function based on a single instruction when a conflict is encountered (i.e., when the compiler needs to choose how to allocate instructions to wait stations) may effect a relatively efficient compilation process, in contrast to an exhaustive brute-force approach that tries to optimize latency across an entire program.

In some embodiments, a compiler may estimate the total run-time for a sequence of instructions based on compilation using a first cost function, then repeat this process one or more times to generate multiple total run-time estimates corresponding to multiple cost functions. An optimal cost function may then be chosen from the multiple candidates, and the source code compiled according to the selected candidate cost function. Each cost function may attempt to estimate a latency cost (e.g., processor cycles spent stalling) when applied to a given set of wait station allocations for instructions in a sequence of instructions. The term "cost" as used herein may refer to a cost measured in one or more computing resources such as processor cycles, execution time, or energy, at compile time and/or runtime.

As used herein, statements that a second item (e.g., a value, calculation, or bit sequence) is "based on" a first item may mean that characteristics of the second item are affected or determined at least in part by characteristics of the first item. The first item may be considered an input to an operation or calculation, or a series of operations or calculations, that produces the second item as an output that is not independent from the first item. In the context of wait stations, a wait station may be selected based on a cost function by comparing an output of the cost function as applied to characteristics of the selected wait station relative to the output of the cost function as applied to characteristics of one or more other wait stations.

As used herein, the term "wait station" refers to a feature of a processor device that enables the association of pending instructions (i.e. instructions that have been issued for execution by the processor device but have not finished execution, also called instructions "in flight") with a wait station such that the wait station is only considered "cleared" (also called "clear" or "empty") once all pending instructions associated with the wait station have completed execution. Wait stations, including example hardware and software implementations thereof, are described in greater detail below.

"Allocating" an instruction to a wait station, as that term is used herein, refers to a compile time process of associating an instruction with a wait station. An instruction derived from the source code may be allocated to a wait station such that a corresponding machine code instruction generated by the compiler, once received by the hardware at run time (i.e. once it becomes a pending instruction), becomes associated with the wait station. Instructions allocated to a wait station at compile time may be re-allocated to a different wait station at compile time based on subsequent operations of the compiler. At run time, once an instruction allocated to a wait station is issued, it remains associated with that same wait station until the wait station is cleared, at which time the instruction is no longer in flight and the instruction is no longer considered to be allocated to the wait station.

"Linking" a read instruction to a wait station, as that term is used herein, refers to a compile time process of associating a read instruction with a wait station such that the read instruction cannot issue until the linked wait station has cleared. Linking may be referred to bidirectionally; a wait station may be said to be linked to an instruction if the instruction is linked to the wait station. During compilation of a sequence of instructions, the compiler may temporarily associate the read instruction with the wait station to assist with optimizing the allocation of write instructions to the various wait stations, as described in greater detail below; this temporary association of the read instruction with the wait station during compilation is what is referred to herein as "linking" the read instruction to the wait station.

Allocation of an instruction to a wait station may also be referred to herein as "adding" the instruction to the wait station, and a pending instruction currently allocated to a wait station may be referred to as being "queued" or "stored" by the wait station. Re-allocation of an instruction from one wait station to another at compile time may be referred to as "moving" the instruction from one wait station to another, or "removing" the instruction from the first wait station and "adding" it to the other. De-allocation of instructions from a wait station when the wait station is cleared at compile time may also be referred to as "removing" or "clearing" the instructions from the wait station.

The embodiments described herein may thus realize one or more advantages, including efficient utilization of hardware wait stations to manage data dependencies, lower software execution time and overall energy consumption due to a smaller amount of time spent stalling, and relatively efficient compilation relative to a brute-force approach. Lower energy consumption may be a particular advantage for mobile devices.

In some aspects, the present disclosure describes a method for generating machine code for execution by an in-order issue processor device having a plurality of wait stations. The method comprises using a compiler to perform a sequence of steps. The compiler is used to receive a sequence of instructions. The sequence of instructions comprises a first write instruction and a current read instruction. The current read instruction is dependent on the execution of the first write instruction by the in-order issue processor device before the current read instruction can be issued for execution by the in-order issue processor device. The first write instruction is initially allocated to an initial wait station of the in-order issue processor device. For each of one or more instructions of the sequence of instructions allocated to a wait station the instruction is re-allocated to a different wait station selected based on a cost function, the current read instruction is linked to a final wait station to which the first write instruction is allocated, and the sequence of instructions is compiled into the machine code. The machine code comprises an ordered sequence of processor operations such that the current read instruction is issued for execution by the in-order issue processor device after all instructions allocated to the final wait station have been executed by the in-order issue processor device.

In some examples, initially allocating the first write instruction to the initial wait station comprises performing a round-robin initial allocation whereby the initial wait station is selected based on its position in an order of wait stations scheduled for allocation.

In some examples, initially allocating the first write instruction to the initial wait station comprises performing a least-occupied initial allocation whereby the initial wait station is selected based on a number of instructions allocated to the initial wait station and one or more of the other wait stations.

In some examples, initially allocating the first write instruction to the initial wait station comprises performing a constrained initial allocation whereby the initial wait station is selected based on characteristics of one or more instructions allocated to the initial wait station.

In some examples, the method further comprises, prior to initially allocating the first write instruction to the initial wait station, determining that each wait station of the plurality of wait stations has reached a maximum wait station capacity, selecting a soonest-cleared wait station as the initial wait station based on an estimated clear time for each wait station (the estimated clear time indicating a latency incurred to finish execution of all instructions allocated to the wait station prior to the first write instruction), and allocating the first write instruction to the soonest-cleared wait station, such that the first write instruction is issued for execution by the in-order issue processor device after all instructions allocated to the soonest-cleared wait station have been executed by the in-order issue processor device.

In some examples, the cost function is calculated based on an issue time of a read instruction dependent on a target write instruction allocated to a target wait station.

In some examples, re-allocating the one or more instructions to a different wait station based on a cost function comprises re-allocating to the target wait station an instruction allocated to another wait station in response to determining that re-allocation of the instruction results in an updated estimated issue time for the current read instruction no more than a variability threshold later than a current issue time of the current read instruction.

In some examples, re-allocating the one or more instructions to a different wait station based on a cost function comprises re-allocating the target write instruction to a destination wait station, the destination wait station being a wait station other than the target wait station, in response to determining that re-allocation of the target write instruction results in an updated estimated issue time for the current read instruction at least a variability threshold sooner than a current issue time of the current read instruction.

In some examples, re-allocating the one or more instructions to a different wait station based on a cost function comprises re-allocating an instruction allocated to the target wait station to another wait station in response to determining that re-allocation of the instruction results in an updated estimated issue time for the current read instruction at least a variability threshold earlier than a current issue time of the current read instruction.

In some examples, the target write instruction is the first write instruction, and the target wait station is the initial wait station.

In some examples, re-allocating the one or more instructions to a different wait station based on a cost function comprises, in response to determining that at least one instruction allocated to the initial wait station has an estimated execution end time more than a variability threshold later than an execution end time of the target write instruction, re-allocating the at least one instruction to another wait station. Re-allocating the one or more instructions to a different wait station based on a cost function comprises, in response to determining that at least one instruction allocated to a wait station other than the initial wait station has an estimated execution end time no more than a variability threshold later than an execution end time of the target write instruction, re-allocating to the initial wait station the at least one instruction allocated to another wait station.

In some examples, the target write instruction is a write instruction with a longer estimated latency than any other write instruction allocated to a wait station.

In some examples, the method further comprises, for each of a plurality of candidate cost functions, calculating an estimated run-time for the sequence of instructions compiled in accordance with the candidate cost function, and selecting the cost function from the plurality of candidate cost functions based on the estimated run-time associated with each candidate cost function.

In some examples, the method further comprises, prior to initially allocating the first write instruction to the initial wait station, determining that each wait station of the plurality of wait stations has reached a maximum wait station capacity, selecting a soonest-cleared wait station as the initial wait station based on an estimated clear time for each wait station (the estimated clear time indicating a latency incurred to finish execution of all instructions allocated to the wait station prior to the first write instruction), and allocating the first write instruction to the soonest-cleared wait station, such that the first write instruction is issued for execution by the in-order issue processor device after all instructions allocated to the soonest-cleared wait station have been executed by the in-order issue processor device.

In some examples, the method further comprises, prior to initially allocating the first write instruction to the initial wait station, determining that each wait station of the plurality of wait stations has reached a maximum wait station capacity, selecting a soonest-cleared wait station as the initial wait station based on an estimated clear time for each wait station (the estimated clear time indicating a latency incurred to finish execution of all instructions allocated to the wait station prior to the first write instruction), and allocating the first write instruction to the soonest-cleared wait station, such that the first write instruction is issued for execution by the in-order issue processor device after all instructions allocated to the soonest-cleared wait station have been executed by the in-order issue processor device.

In some aspects, the present disclosure describes a device. The device comprises one or more processor devices and a memory storing instructions. The instructions, when executed by the one or more processor devices, cause the device to compile a sequence of instructions into machine code according to the method steps described above.

In some aspects, the present disclosure describes a device. The device comprises an in-order issue processor device and a memory storing machine code compiled according to the method steps described above.

In some examples, an instruction of the machine code allocated to a wait station comprises a binary sequence including a wait station identifier identifying the wait station to which the instruction is allocated.

In some examples, the in-order issue processor device includes, for each wait station, a counter register storing a counter value indicating a number of pending instructions allocated to the wait station.

In some aspects, the present disclosure describes a processor-readable medium having instructions tangibly stored thereon. The instructions comprise machine code compiled in accordance with the method steps described above.

BRIEF DESCRIPTION OF THE DRAWINGS

Reference will now be made, by way of example, to the accompanying drawings which show example embodiments of the present application, and in which:

FIG. 5 is three blocks of source code showing an example pseudo-code implementation of the first example method for wait station conflict resolution of FIG. 4.

Similar reference numerals may have been used in different figures to denote similar components.

DESCRIPTION OF EXAMPLE EMBODIMENTS

Figure 1:
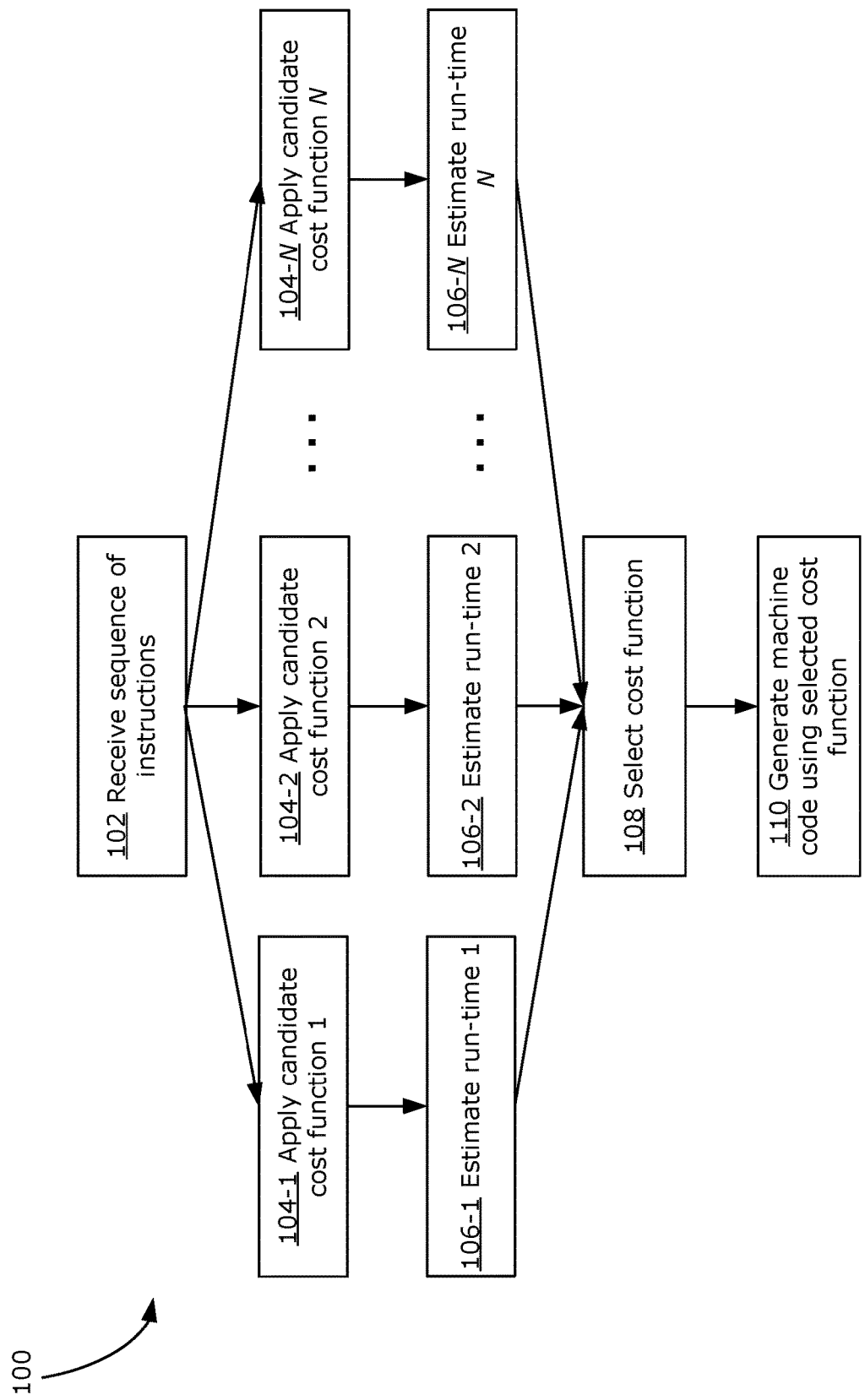
FIG. 1 is a flowchart of a method for selecting a cost function from a plurality of candidate cost functions for compiling a particular sequence of instructions from source code, in accordance with examples described herein.

In examples disclosed herein, methods, devices and media are described that provide efficient data dependency management for in-order issue processors. As discussed above, some described examples may exhibit particular advantages in environments or domains governed by five constraints: first, the processor device has a limited number of wait stations for queueing pending instructions (e.g., three wait stations); second, each wait station has a limited capacity; third, the processor device requires instructions to be issued in order; fourth, the source code contains write instructions that have variable latency (which is unknown at compile time and is not known until run time); and fifth, compilation time is limited (making a brute-force approach to optimization impracticable).

Some processor devices may provide wait stations (WS) which can be used to handle the true dependencies (RAW). A wait station tells the hardware which write instructions need to finish executing before the hardware can proceed with issuing new instructions for execution by the processor device. For example, if a processor device has only one wait station, and the source code contains an instruction sequence (P1, P2, P3, C1, C2, and C3) wherein C1 is a consumer (i.e. read instruction) that depends on producer (i.e. write instruction) P1, the compiler can specify that P1, P2 and P3 will use the available wait station, and as such the hardware will wait for P1, P2 and P3 to finish executing before it proceeds with issuing C1, C2 and C3. In some embodiments, a wait station may be implemented by including a wait station identifier as part of each instruction queued in a wait station, as well as a hardware register storing a count value indicating the number of instructions currently queued in the wait station.

During compilation, as the compiler schedules a sequence of instructions in the source code, the compiler may allocate some instructions (e.g., write instructions) to wait stations. Wait station allocation can be divided into two phases: an initial allocation phase associates the instruction with an initial wait station, and a conflict resolution phase may result in re-allocation of the instruction to another wait station if a conflict arises due to constraints. Initial allocation can be performed using any of a number of known algorithms or approaches (e.g., graph coloring, round-robin, shortest-path, etc.). Conflict resolution is potentially more complicated due to the constraints described above. For example, whenever a sequence of write instructions appears in the source code resulting in a greater number of write instruction than the number of available wait stations, a decision must be made as to which wait stations receive which instructions. In the context of register allocation, when a conflict arises, it can typically be resolved by spilling register contents to memory. In the presence of the constraints described above, however, spilling to memory is not an option, as the processor device has a strictly limited number of wait stations. In addition, in a shortest-path problem, picking a node on the shortest path doesn't trigger a change in the graph topology or the weights of edges; however, in wait station allocation, a partial solution affects all of the subsequent solutions. Therefore, unique problems may arise in allocating instructions to wait stations in the presence of the constraints described above.

In some embodiments, the latency of a write instruction may be unknown at compile time but may be estimated. For example, write instructions may have variable latencies that can nonetheless be categorized at compile time into one of several latency categories, e.g., low, medium, and high latency. This categorization may enable the compiler to estimate execution time for one or more instructions and use these estimates to optimize a total run-time for a sequence of instructions by allocating instructions to wait stations based on their positions in the sequence of instructions and their estimated latencies.

Some embodiments described herein may use a greedy-based approach to optimizing latency. A greedy algorithm is a type of approximation algorithm used in combinatorial optimization problems. Greedy algorithms make the optimal choice at each step of a process as they attempt to find an overall optimal way to solve an entire problem. In the examples described herein, a greedy algorithm may resolve wait station allocation conflicts based on a specific cost function or model, such as a latency cost function that estimates the latency incurred by executing a specific instruction in the context of a given pattern or configuration of wait station allocations of prior instructions. This cost function can be defined based on different factors in different embodiments. In some embodiments, depending on the compilation time constraint, an allocation algorithm of the compiler may be executed based on different cost functions, and the cost function that is projected to produce the best end-to-end latency may be selected for use in generating the final machine code.

FIG. 1 shows a flowchart of a method 100 for selecting a cost function from a plurality of candidate cost functions for compiling a particular collection of source code.

At 102, a sequence of instructions derived from source code is received by a compiler.

Steps 104 and 106 are then repeated for each of N candidate cost functions. A candidate cost function may be any of the various cost functions described in greater detail below. In some embodiments, each cost function is implemented as greedy algorithm seeking to optimize latency for a single instruction.

Thus, at 104-1, a first candidate cost function (candidate cost function 1) is applied by the compiler to schedule the instructions of the source code and allocate the instructions to wait stations. The first candidate cost function is applied to resolve conflicts regarding wait station allocation. The scheduler of the compiler may return a schedule including estimated latency incurred by each instruction, as described in greater detail below.

At 106-1, a total run-time for the compiled instructions is estimated, e.g., by the compiler or by a separate run-time estimator software module. The total run-time estimate may be based on the estimated latency of each instruction generated by the scheduler at step 104-1. The estimated total run-time is thus calculated based on the instructions as scheduled, allocated to wait stations, and compiled in accordance with the first candidate cost function.

At 104-2, the same operations as step 104-1 are carried out by applying a second candidate cost function (candidate cost function 2). At 106-2, the same operations as step 106-1 are carried out by estimating the total run-time of the instructions compiled in accordance with the second candidate cost function. Steps 104 and 106 are repeated for each of N candidate cost functions, wherein N>1.

At 108, a cost function is selected from the plurality of N candidate cost functions based on the estimated run-time of each candidate cost function. In some embodiments, the candidate cost function with the lowest estimated total run-time is selected.

At 110, machine code is generated by the compiler by applying the selected candidate cost function to the sequence of instructions for the purpose of wait station allocation.

The compile-time method steps and operations described herein may be implemented on a device configured to execute a compiler to compile source code. The run-time method steps and operations described herein may be implemented on a device with an in-order issue processor device. Examples of such devices will now be described with reference to FIGS. 2A and 2B.

Example Computing Devices

Figure 2A:
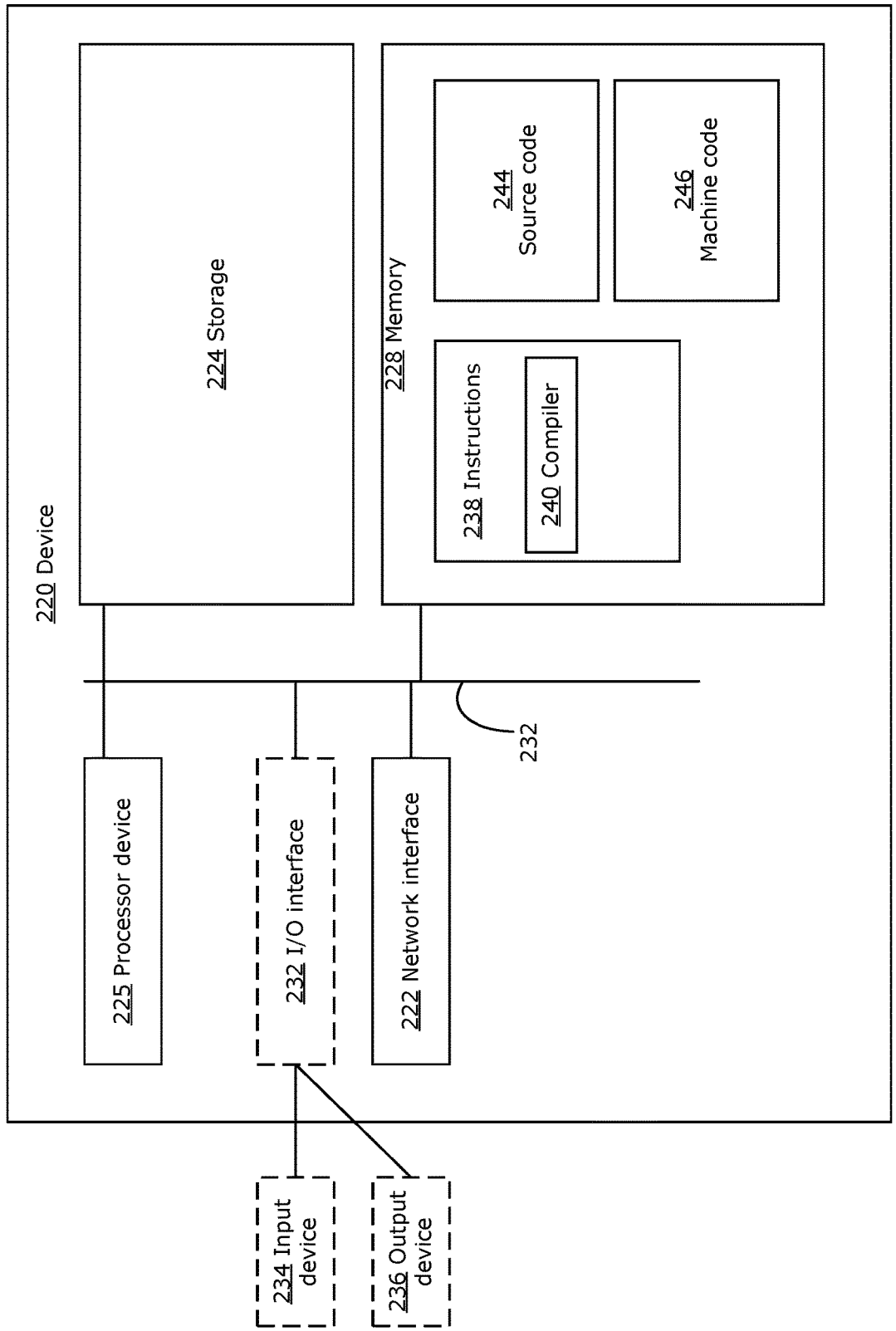
FIG. 2A is a block diagram of a first example device suitable for implementation of compile-time compilation of machine code in accordance with examples described herein.

FIG. 2A is a block diagram illustrating a simplified example of a computing device 220, such as a computer or a cloud computing platform, suitable for carrying out examples described herein, and in particular for executing the compile-time method steps and operations described herein. Other examples suitable for implementing embodiments described in the present disclosure may be used, which may include components different from those discussed below. Although FIG. 2 shows a single instance of each component, there may be multiple instances of each component in the device 220.

The device 220 of FIG. 2A illustrates an environment in which source code may be compiled into machine code using the techniques described herein. The device 220 may include one or more processor devices 225, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The device 220 may also include one or more optional input/output (I/O) interfaces 232, which may enable interfacing with one or more optional input devices 234 and/or optional output devices 236.

In the example shown, the input device(s) 234 (e.g., a keyboard, a mouse, a microphone, a touchscreen, and/or a keypad) and output device(s) 236 (e.g., a display, a speaker and/or a printer) are shown as optional and external to the device 220. In other examples, there may not be any input device(s) 234 and output device(s) 236, in which case the I/O interface(s) 232 may not be needed.

The device 220 may include one or more network interfaces 222 for wired or wireless communication with one or more devices or systems of a network, such as a network being modeled by the methods described herein. The network interface(s) 222 may include wired links (e.g., Ethernet cable) and/or wireless links (e.g., one or more antennas) for intra-network and/or inter-network communications.

The device 220 may also include one or more storage units 224, which may include a mass storage unit such as a solid state drive, a hard disk drive, a magnetic disk drive and/or an optical disk drive.

The device 220 may include one or more memories 228, which may include a volatile or non-volatile memory (e.g., a flash memory, a random access memory (RAM), and/or a read-only memory (ROM)). The non-transitory memory(ies) 228 may store instructions for execution by the processor device(s) 225, such as to carry out examples described in the present disclosure. The memory(ies) 228 may include other software instructions 238, such as for implementing an operating system and other applications/functions. In some examples, the memory(ies) 228 may include software instructions 238 for execution by the processor device 225 to implement a compiler 240, as described further below. The compiler 240 may be loaded into the memory(ies) 228 by executing the instructions 238 using the processor device 225.

The memor(ies) 228 may also include source code 244 loaded from storage 224 or from some other source. The compiler 240 may be executed by the processor device 225 to compile the source code 244 into machine code 246 as described herein.

In some examples, the device 220 may additionally or alternatively execute instructions from an external memory (e.g., an external drive in wired or wireless communication with the device 220) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The device 220 may also include a bus 242 providing communication among components of the device 220, including those components discussed above. The bus 242 may be any suitable bus architecture including, for example, a memory bus, a peripheral bus or a video bus.

It will be appreciated that various components and operations described herein can be implemented on multiple separate devices or systems in some embodiments.

Figure 2B:
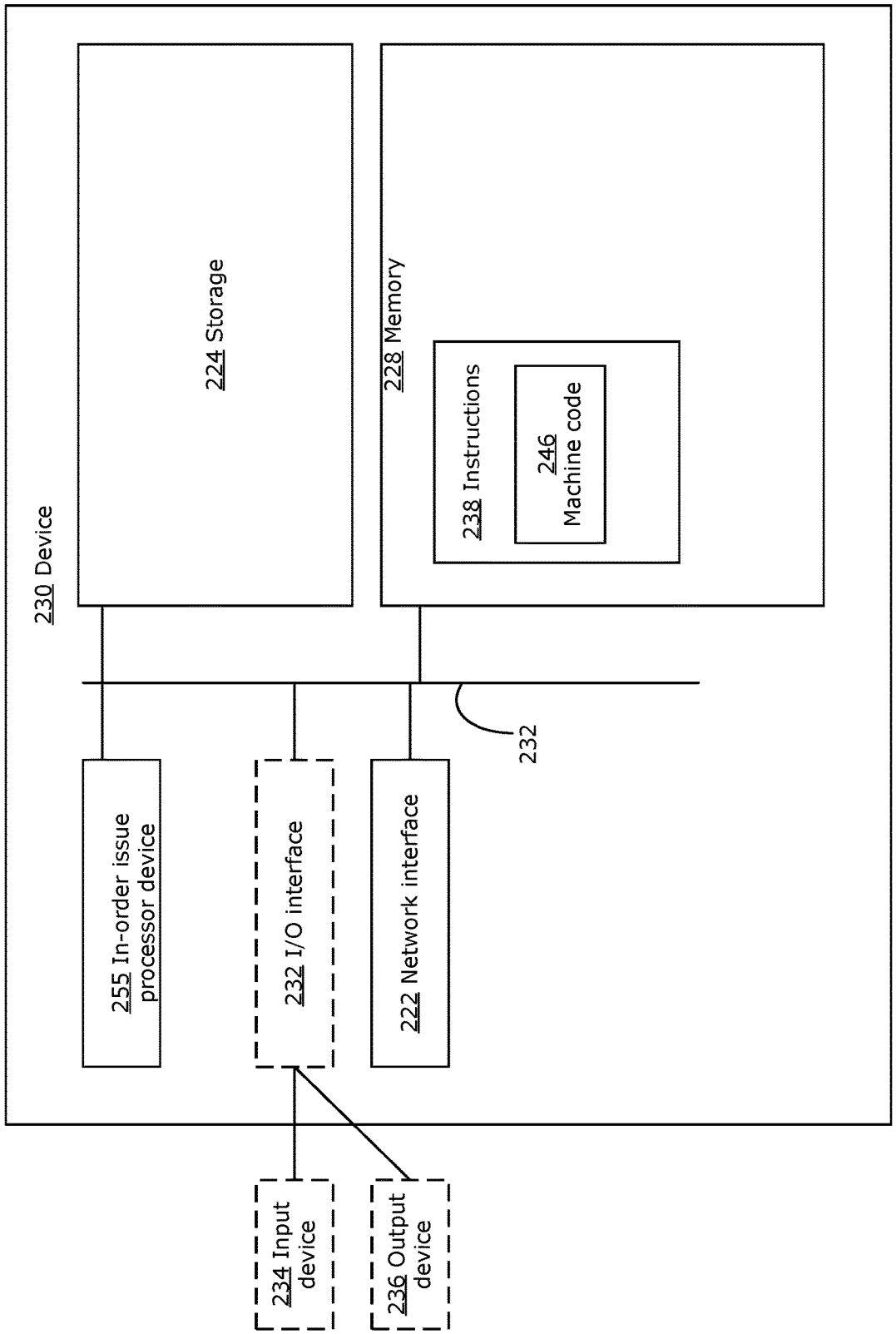
FIG. 2B is a block diagram of a second example device suitable for run-time execution of machine code generated in accordance with examples described herein.

FIG. 2B is a block diagram illustrating a simplified example of a second computing device 250, such as a computer or a cloud computing platform, suitable for executing machine code compiled as described herein, e.g., by compiler 240 of device 220. FIG. 2B is therefore suitable for executing the run-time method steps and operations described herein. It will be appreciated that, in some examples, device 220 and device 250 may be the same device.

The second device 250 of FIG. 2A illustrates an environment in which machine code compiled using the techniques described herein may be executed. The device 250 includes many of the same components as device 220 indicated by identical numerals. However, the second device 250 includes an in-order issue processor device 255 as described above, i.e. a processor device wherein instructions must be issued in sequential order. Furthermore, the second device 250 has instructions 258 stored in its memor(ies) 228 that include the compiled machine code 246 compiled by the compiler 240 of first device 220.

The two stages of wait station allocation performed by the compiler will now be described. Initial allocation will be described with reference to FIGS. 3-4, and conflict resolution will be described with reference to FIGS. 5-7.

Initial Wait Station Allocation

As describe above, the initial allocation of instructions to wait stations can be performed using any of a number of known algorithms or approaches (e.g., graph coloring, round-robin, shortest-path, etc.). Several example initial allocation methods will now be described. It will be appreciated that, in each initial allocation method, the instructions of the source code are processed in sequence, and when an instruction is encountered that needs to be allocated to a wait station (e.g., a write instruction), an initial wait station is selected. The examples will be described with reference to write instructions being the instructions allocated to wait stations, and with reference to a processor device having three wait stations (ws1, ws2, and ws3).

In a round-robin initial allocation method, the initial wait station is selected for the write instruction based on the position of the wait station in an order of wait stations scheduled for allocation. Thus, for example, the order of wait stations scheduled for allocation may be a repeated sequence of ws1, ws2, ws3. If the last write instruction was allocated to ws3, then the next write instruction is allocated to ws1, and so on.

In a least-occupied initial allocation method, the initial wait station is selected based on a number of instructions allocated to the initial wait station and one or more of the other wait stations. For example, the method may compare the number of write instructions allocated to each wait station (e.g. 1 in ws1, 0 in ws2, 4 in ws3) and select the wait station with the smallest number of write instructions (i.e., ws2).

In a constrained initial allocation method, the initial wait station is selected based on characteristics of one or more instructions allocated to the initial wait station. For example, the estimated latency of a write instruction may be the characteristic used to group it together with other write instructions in association with a particular wait station. Thus, for example, if ws1 stores 2 write instructions with low estimated latency (e.g., 50 cycles), ws2 stores 4 instructions with medium estimated latency (e.g., 100 cycles), and ws3 stores 1 instruction with long estimated latency (e.g., 200 cycles), and the current write instruction has medium estimated latency, then the constrained initial allocation method may allocate the current write instruction to ws2.

It will be appreciated that a number of other initial allocation methods may be used in various embodiments, including methods that combine features from two or more of the methods described above (e.g., by falling back on a second method if the first method selects a wait station at full capacity or if the first method results in two or more equally valid options).

An example of initial wait station allocation will now be described with reference to FIG. 3. The example uses a least-occupied initial allocation method as described above.

In this example, the compiler receives a sequence of source code instructions [p_0, p_1, p_2, p_3, c_3, p_4, c_1, p_5, c_0, c_2, c_4, c_5]. Each consumer (i.e. read instruction) $c_i$ depends on a producer (i.e. write instruction) $p_i$. Table 1 below shows how the producers are allocated to three different wait stations (ws1, ws2, and ws3) of the in-order issue processor device based on a least-occupied method. The compiler loops through the list of instructions, and assigns producers to wait stations based on which wait station has the smallest number of producers waiting.

TABLE 1

| Decision | Wait Station 1 | Wait Station 2 | Wait Station 3 |
| --- | --- | --- | --- |
| Insert P_0 | P_0 | | |
| Insert P_1 | | P_1 | |
| Insert P_2 | | | P_2 |
| Insert P_3 | P_3 | | |

TABLE 1-continued

| Decision | Wait Station 1 | Wait Station 2 | Wait Station 3 |
| --- | --- | --- | --- |
| C_3 clears WS1 | (cleared) | | |
| Insert P_4 | P_4 | | |
| C_1 clears WS2 | | (cleared) | |
| Insert P_5 | | P_5 | |
| C_0 does nothing | | | |
| C_2 clears WS3 | | | (cleared) |
| C_4 clears WS1 | (cleared) | | |
| C_5 clears WS2 | | (cleared) | |

Figure 3A:
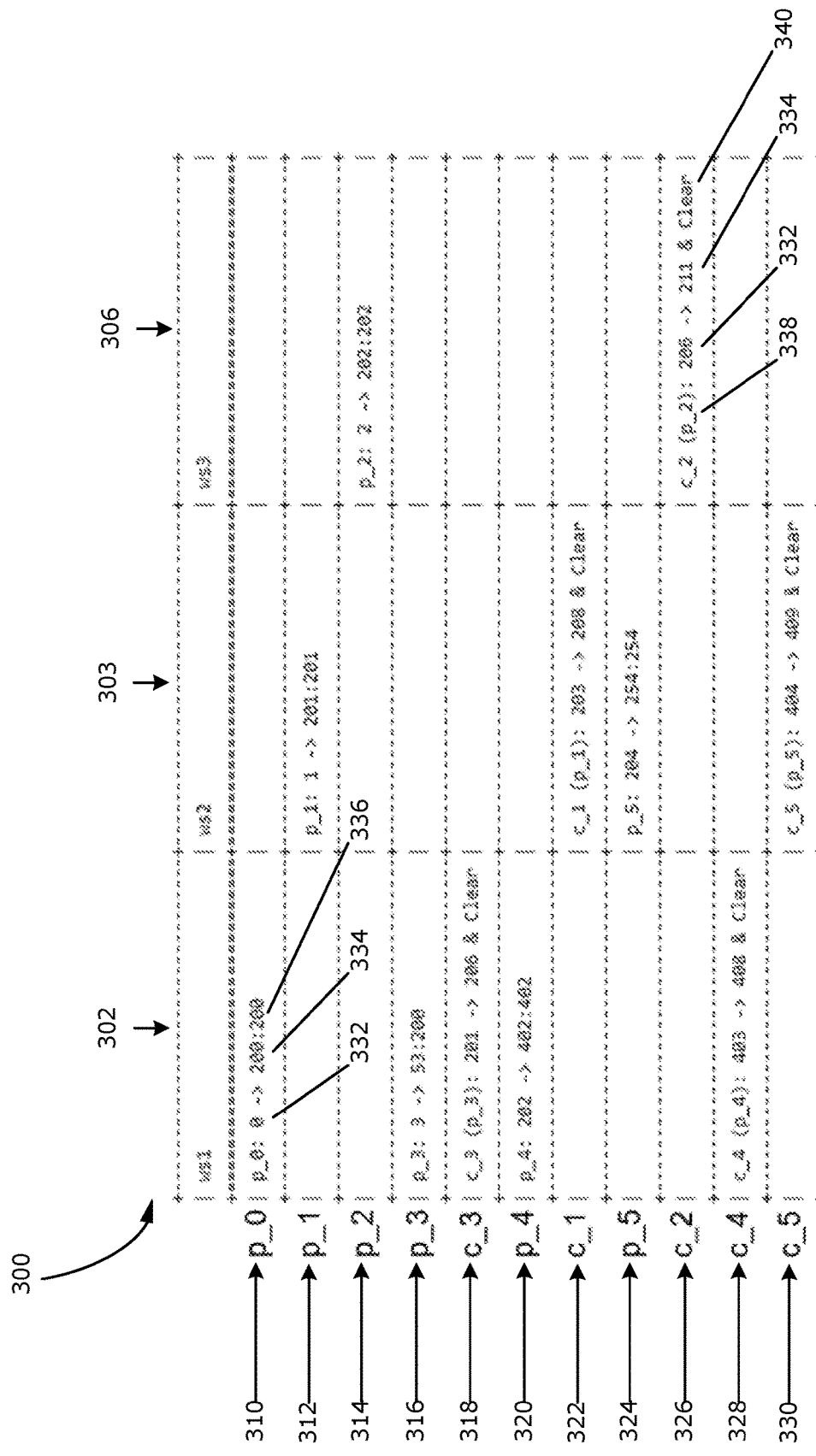
FIG. 3A is a table showing initial wait station allocations resulting from a least-occupied method of initial wait station allocation applied to an example sequence of instructions, in accordance with examples described herein.

FIG. 3A is a table showing the wait station allocation 300 resulting from the least-occupied method of initial allocation from Table 1. Write instructions are associated with ws1 302, ws2 304, or ws3 306 as they are allocated by the compiler. Each entry in the table identifies the instruction (e.g., "p_0") and indicates several pieces of information relevant to the schedule. An issue cycle value 332 (also called an "issue time" or "issue cycle") indicates the processor cycle (starting at cycle 0 in this example) at which the instruction will issue for execution at run-time. An end cycle value 334 (also called an "execution end time" or "execution end cycle") indicates the cycle at which the instruction will finish executing. A wait station end cycle value 336 (also called a "wait station execution end time", "wait station execution end time", or "wait station clear time") indicates the cycle at which the last instruction associated with the wait station will finish executing, based on the instruction processed up to this point in the sequence of instructions. Thus, the location and format for the entry for instruction p_0 310, "p_0:0→200:200", indicates that instruction p_0 is associated with ws1 302, and will issue at cycle 0, will finish executing at cycle 200, and that the last instruction associated with p_0 at this stage of wait station allocation will complete execution at cycle 200 (i.e., p_0 itself).

When a read instruction is processed, the corresponding entry has a slightly different format. Any dependencies 338 are indicated in parentheses. Instead of a wait station end cycle value 336, the entry includes a clearance indicator 340 indicating that the wait station associated with the dependency must clear before the read instruction is issued. Thus, the entry associated with read instruction c_2 326, "c_2 (p_2): 206→211 & clear", indicates a dependency 338 on p_2, indicates that c_2 will issue at cycle 206 and complete execution at cycle 211, and indicates that ws3 will be cleared when it issues.

The least-occupied initial allocation method begins by processing write instruction p_0 310. All wait stations are empty, so any wait station could be selected for allocating p_0 310. In this example, a round-robin initial allocation method starting with ws1 may be used as a fallback initial allocation method if the least-occupied method does not produce a definite result. Thus, ws1 302 is selected, and p_0 310 is allocated to ws1. The initial allocation in this example begins at cycle 0. Thus, the issue cycle 332 of p_0 310 is 0.

In this example, the instructions in the sequence are estimated to have latencies of 200 cycles (p_0, p_1, p_2, and p_4), 50 cycles (p_3 and p_5), or 5 cycles (all consumers c_0 through c_5). The write instruction latencies of 50 and 200 cycles correspond to medium and high estimated latency categories respectively, as described above.

Thus, in this example the entry for p_0 310 has an end cycle value 334 of 200 (i.e. issue cycle 0+200 latency), and a wait station end cycle value 336 of 200 as well (because it is the only instruction allocated to ws1 302).

Each other instruction proceeds in the same fashion. P_1 312 is allocated to ws2 304 and issues at cycle 1 (i.e. 1 cycle after p_0 issues at cycle 0, because issuing an instruction takes one cycle). P_2 314 is allocated to ws3 306 and issues at cycle 2. P_3 316 is allocated to ws1 302 and issues at cycle 3. P_3 has a latency of only 50 cycles, so its end cycle is 53. However, because p_0 is also allocated to ws1 302, and p_0 has an end cycle value of 200, the wait station end cycle value 336 of ws1 302 is still 200.

Read instruction c_3 318 is then processed. C_3 318 depends on p_3 316, which is allocated to ws1 302. Thus, ws1 302 must be cleared (i.e. all instruction in ws1 302 must finish executing and be de-allocated from ws1) before c_3 318 can be issued. C_3 318 therefore must stall its issuance until cycle 201 (i.e. one cycle after p_3 316 finishes execution at end cycle 200, which is also the wait station end cycle value 336 for ws1 302). C_3 318 has an estimated latency of 5 cycles, so it issues at cycle 201 and ends at cycle 206.

P_4 320 is then processed. Because ws1 302 is now empty, it is the least occupied wait station, so p_4 320 is allocated to ws1 302. P_4 has an estimated latency of 200 cycles. It can issue immediately after c_3 318 issues, at cycle 202. It will end at cycle 402 (because it has a latency of 200 cycles).

C_1 322 is dependent on P_1 312 in ws2 304, so it issues at cycle 203 and clears ws2 304. P_5 324 is next to be processed, and because ws2 304 is now empty, p_5 is allocated to ws2 304. P_5 324 has a latency of 50 cycles, so it issues at cycle 204 and ends at cycle 254.

C_0 is not shown in FIG. 3. It has no dependencies in flight (i.e. currently allocated to a wait station), because its dependency p_0 was already de-allocated from ws1 when c_3 was processed, and so c_0 issues immediately after p_5, at cycle 205.

C_2 326 depends on p_2 in ws3 306. The wait station end cycle value 336 for ws3 is 202. Thus, c_2 does not need to stall, and it issues immediately after c_0, at cycle 206. It also clears ws3 306.

C_4 328 is dependent on p_4 in ws1, which has a wait station end cycle value 336 of 402. This results in a lengthy stall before c_4 can issue at cycle 403. Finally, c_5 330 is processed. It depends on p_5 in ws2, which has a wait station end cycle value 336 of 254. Thus, no stall is necessary, and c_5 issues at cycle 404 immediately after c_4 issues. C_5 completes execution at cycle 409. Thus, the total estimated run-time of the sequence of instructions is 409 cycles.

Conflicts may be encountered even during initial wait station allocation. If the compiler determines that each wait station has reached a maximum wait station capacity (i.e. every wait station has the maximum number of in-flight instructions allocated to it), and a further instruction is encountered in the sequence of instructions that must be allocated to a wait station (e.g., because it is a write instruction), then the compiler must clear a wait station before the new instruction can be allocated to a wait station. In some embodiments, the compiler identifies a soonest-cleared wait station as the initial wait station that must be cleared. The compiler may calculate an estimated clear time for each wait station and choose the wait station with the earliest or soonest clear time. The estimated clear time indicates a latency incurred to finish execution of all instructions allocated to the wait station prior to the new instruction. The compiler may schedule the new instruction to be issued and allocated to the soonest-cleared wait station only after the soonest-cleared wait station is clear. Thus, in the example of FIG. 3B, if each wait station had a maximum capacity of a single instruction, then the compiler would need to clear a wait station before allocating p_3 316. Ws1 302 would be selected as the soonest-cleared wait station based on having the earliest clear time (i.e. wait station end cycle value 336=200 for ws1). P_3 316 would be assigned an issue cycle 332 of 201, immediately after ws1 clears. At run-time, p_3 316 would need to wait until all instructions allocated to the soonest-cleared wait station (i.e. ws1) have been executed before being issued for execution.

Figure 3B:
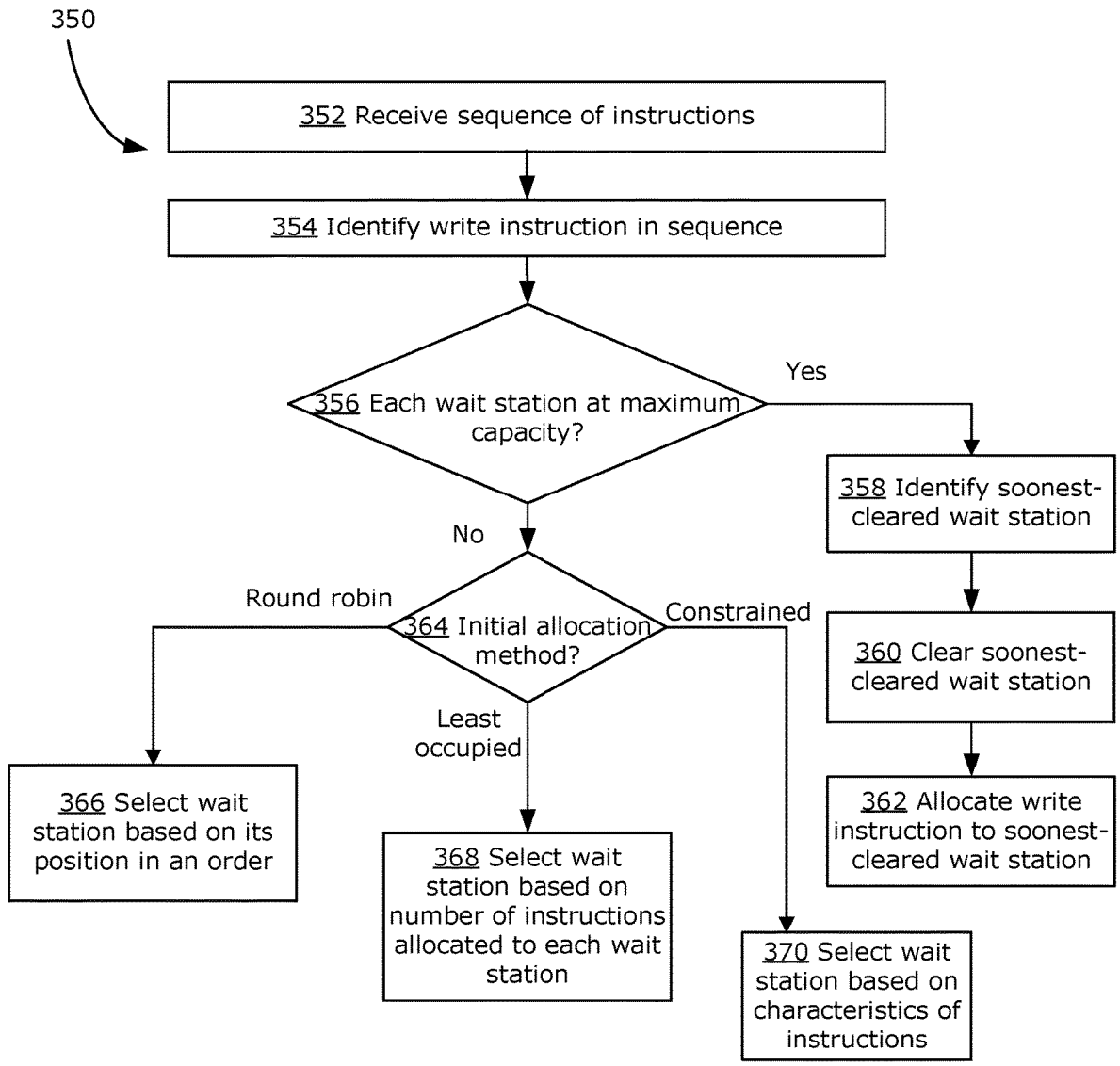
FIG. 3B is a flowchart showing steps of a method for initial wait station allocation, in accordance with examples described herein.

FIG. 3B is a flowchart showing steps of an example method 350 for initial wait station allocation of a write instruction as described above.

At 352, the compiler receives a sequence of instructions derived from the source code.

At 354, a write instruction (i.e. a producer) is identified in the sequence of instructions.

At 356, if each wait station is at a maximum wait station capacity, the method 350 proceeds to step 358. Otherwise the method 350 proceeds to step 364.

At 358, a soonest-cleared wait station is identified as described above.

At 360, the soonest-cleared wait station is cleared. This simply means that the estimated issue cycle 332 for the producer is scheduled for the cycle following the wait station clear cycle 336 of the soonest-cleared wait station.

At 362, the producer is allocated to the soonest-cleared wait station.

At 364, if there is at least one wait station that is not full, the method 350 identifies which initial allocation method is being used. If a round-robin method is being used, the method 350 proceeds to step 366, and a wait station is selected for the producer based on its position in order. If a least-occupied method is being used, the method 350 proceeds to step 368, and a wait station is selected for the producer based on the number of instructions currently allocated to each wait station. If a constrained allocation method is being used, the method 350 proceeds to step 370, and a wait station is selected for the producer based on characteristics (e.g. estimated latency category) of the instructions currently allocated to each wait station.

It will be appreciated that initial allocation of an entire sequence of instructions involves other steps, as well as repetition of method 350 for each additional write instruction encountered in the sequence. Read instructions will be scheduled such that they wait for the wait station of any dependencies to clear before issuing, as described above. Other initial allocation methods may be used in addition to those described above.

Wait Station Allocation Conflict Resolution

Initial wait station allocation may be used by itself in some embodiments as the final allocation for wait stations. However, in many embodiments, the initial allocation method may encounter conflicts that need to be resolved. When the initial wait station allocation method encounters a read instruction and the number of write instructions currently allocated to wait stations is greater than the number of wait stations (i.e. at least one of the wait stations has two or more write instructions allocated to it), a conflict may arise that needs to be resolved. In some embodiments, such conflicts are resolved by applying a cost function to the current state of the system the current stage of compilation (i.e., the current read instruction being processed by the compiler and the current allocation of write instructions to wait stations).

In each example method for conflict resolution described below, a greedy algorithm is used, as each instruction of the sequence of instructions is processed by the compiler, to optimize a cost function based on an issue time of a current read instruction by re-allocating write instructions in flight to or from the wait station of a target write instruction allocated to a target wait station, wherein the target write instruction is a dependency of the current read instruction. Thus, the compiler processes each instruction in the sequence of instructions in order. As each instruction is processed by the compiler, a cost function is optimized at that processing step. The cost function is calculated based on an estimated issue time of an instruction in the sequence. In the first example method described below with reference to FIG. 4, the instruction whose execution end time is optimized is the current read instruction being processed. In the first example method described below with reference to FIG. 7, the instruction whose issue time is optimized is a read instruction dependent on a write instruction in flight (i.e. currently allocated to a wait station) having a later estimated execution end time than any other instruction in flight. In both methods, the write instruction being optimized may be referred to as the "target write instruction", and the wait station where it has been initially allocated (e.g., by method 350 above) may be referred to as the "target wait station". It will be appreciated that many other possible conflict resolution methods using many different cost functions are possible, and could be used in addition to or in place of the two example methods below for determining an optimal cost function according to method 100 above.

Figure 4:
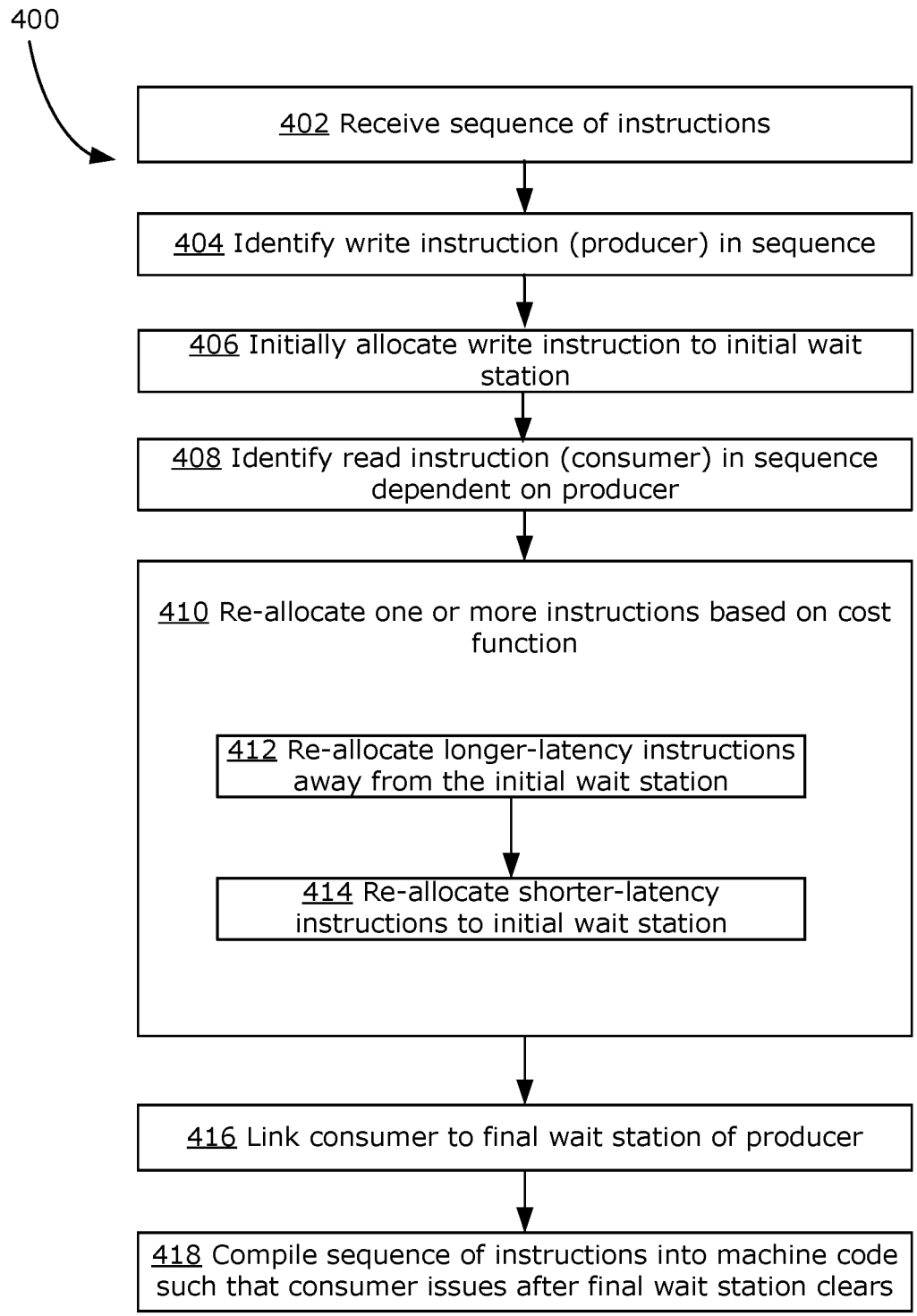
FIG. 4 is a flowchart showing steps of a first example method for wait station conflict resolution, in accordance with examples described herein.

FIG. 4 is a flowchart showing steps of a first example method 400 for wait station conflict resolution. In this first method 400, the instruction whose execution end time is optimized (i.e. the target write instruction) is the current write instruction being processed. It will be appreciated that method 400 includes an initial wait station allocation step 406, which may be method 350 above in some embodiments.

At 402, the sequence of instructions is received by the compiler.

At 404, the sequence of instructions is processed one instruction at a time as in method 350, and a write instruction is identified in the sequence. This write instruction may be referred to in the context of method 400 as the target write instruction or the producer.

At 406, the producer is initially allocated to a wait station. This step 406 may perform initial allocation according to the steps of method 350.

At 408, a read instruction is identified in the sequence of instructions. This read instruction may be referred to in the context of method 400 as the consumer.

At 410, for each of one or more instructions of the sequence of instructions allocated to a wait station, the instruction is re-allocated to a different wait station based on the cost function. Step 410 includes sub-steps 412 and 414.

The execution end time of a read instruction may be represented as $C_i^{end}=\max(\max([P_1^{end}, P_2^{end}, \ldots, P_k^{end}]), I_{i-1}^{issue})+C_i^{latency}$, wherein $C_i^{end}$ is the execution end time (i.e. end cycle 334) of a read instruction $C_i$, $[P_1^{end}, P_2^{end}, \ldots, P_k^{end}]$ are the execution end times of the set of write instructions (i.e. producers $p_1, p_2, \ldots, p_k$) allocated to the wait station linked to read instruction $C_i$, $\max([P_1^{end}, P_2^{end}, \ldots, P_k^{end}])$ is the wait station end cycle 336 of the wait station linked to read instruction $C_i$, $I_{i-1}^{issue}$ is the issue time (i.e. issue cycle 332) of the previous instruction in the sequence of instructions, and $C_i^{latency}$ is the fixed latency of the read instruction (e.g., 5 cycles in the example of FIG. 3A).

Thus, an optimal allocation of write instructions to wait stations would allow each read instruction to issue immediately after its dependency $p_i$ completes execution, such that $C_i^{end}=\max(P_i^{end}, I_{i-1}^{issue})+C_i^{latency}$. The purpose of conflict resolution is to achieve as close as possible to this optimal configuration for each read instruction in the sequence. The difference between this optimal configuration and the actual $C_i^{end}$ achieved for each consumer by a given wait station allocation represents a cost that the cost function seeks to minimize.

At each processing stage (i.e. as each instruction is processed by the compiler to determine wait station allocations and re-allocations), the greedy algorithm seeks to minimize the cost function with respect to a single instruction. In method 400, the single instruction $C_i$ is the current consumer. This means that the greedy algorithm must re-allocate instructions to different wait stations to minimize the execution end time (end cycle 334) of the consumer. However, this minimizing function is equivalent to minimizing the issue time (issue cycle 332) of $C_i$, which further reduces to minimizing the wait station clear time (wait station end cycle value 336) of the wait station linked to $C_i$. Because the consumer cannot issue until the execution end time of its dependency (producer $p_i$), this means that the cost function can be further reduced to minimizing the estimated difference between the execution end cycle value 334 of the producer and the wait station end cycle value 336 of the producer's wait station. This can be accomplished by some combination of re-allocating the producer to another wait station, re-allocating one or more instructions in the producer's initial wait station to another wait station, and/or re-allocating one or more instructions in another wait station to the producer's initial wait station. While this last step cannot reduce the cost function for the current read instruction, it can contribute to reducing later costs. These various techniques will be described in the context of method 400 with reference to steps 412 and 414.

At 412, instructions allocated to the target wait station (i.e. the initial wait station of the producer) may be re-allocated to other wait stations if the instructions have estimated execution end times a significant amount of time after the execution end time of the target write instruction (i.e. the producer).

At 414, instructions allocated to other wait stations may be re-allocated to the target wait station (i.e. the initial wait station of the producer) if the instructions have estimated execution end times before, or only shortly after, the execution end time of the target write instruction (i.e. the producer).

In some embodiments, the compiler may identify any instructions that have an estimated execution end time (end cycle 334) before or almost equal to the producer (called "shorter-latency instructions"), and any instructions with an estimated execution end time later than this (called "longer-latency instructions"). This identification may be performed in some embodiments by identifying as shorter-latency instructions any instructions whose estimated execution end time is either before that of the producer, or within a variability threshold later than that of the producer. In some embodiments, the variability threshold may be based on estimated latencies of various latency categories. For example, the variability threshold may be 10 cycles in embodiments wherein a "long latency" instruction is estimated to be 200 cycles. However, any value may be used for the variability threshold.

In some embodiments, steps 412 and 414 may be performed together or in several stages. For example, some embodiments may first perform step 412 to re-allocate as many longer-latency instructions as possible from the target wait station. Then steps 412 and 414 may be performed together in the form of swapping any remaining longer-latency instructions in the target wait station with shorter-latency instructions in other wait stations. Then step 414 may be performed again in the form of filling the target wait station up to its maximum capacity with any remaining shorter-latency instructions in other wait stations.

After the re-allocations steps 412 and 414 have been performed, the estimated issue time (e.g., issue cycle 302) of the current read instruction may be updated from its current estimated issue time to an updated estimated issue time. The updated estimated issue time may also calculated for each potential re-allocation during steps 412 and 414 and may be used in some embodiments to determine whether a potential re-allocation should be made. For example, in some embodiments a re-allocation of a producer away from the target wait station is made only if they result in an updated estimated issue time more than the variability threshold earlier than the current estimated issue time, and a re-allocation of a producer into the target wait station is made only if it does not result in an updated estimated issue time more than the variability threshold later than the current estimated issue time.

It will be appreciated that the variability threshold introduces a certain amount of flexibility into the greedy algorithm, such that it does not strictly "optimize" or "minimize" the cost function despite such terminology being used herein. This is due in part to the highly uncertain estimates used to estimate instruction latencies, which introduces a great deal of imprecision to calculations of latency and so diminishes the value of strict greedy optimization. Greater overall optimization and efficiency may be achieved by introducing the variability threshold to group instructions having roughly similar end times together in a wait station. Thus, any use of terms such as "optimize" or "minimize" herein should be understood in this context.

Returning to FIG. 4, at 416 the consumer is linked to the final wait station of the producer. In this example, the initial wait station of the producer is the same as the final wait station of the producer. However, in some examples, step 410 may involve re-allocating the producer from its initial wait station to a different final wait station.

At 418, the sequence of instructions is compiled into machine code by the compiler such that, at run-time, the consumer is issued for execution by the in-order issue processor device only after the final wait station has cleared (i.e., all instructions allocated to the final wait station have completed execution).

FIG. 5 shows three blocks of source code showing an example pseudo-code implementation of the first example method 400 for wait station conflict resolution.

The first block 502 defines a function Allocate that receives as input parameters a variable Instruction List (i.e. the sequence of instructions) and WSList (i.e. the list of wait stations). As the sequence of instructions is processed, producers (write instructions) are handled by invoking a function HandleProducer, and producers (write instructions) are handled by invoking a function HandleConsumer.

The second block 504 defines the function HandleProducer. This block 504 corresponds to the initial wait station allocation method 350 of FIG. 3B, using a least-occupied initial allocation method.

The third block 506 defines the function HandleConsumer. This block 506 manages any conflict resolution resulting from a read instruction being processed, and any re-allocations necessary to optimize the cost function. If the dependency (i.e. the producer) has already finished execution (i.e. is not allocated to a wait station), the consumer can be issued immediately, and there is no conflict. If the producer is still executing, the conflict resolution method 400 may be applied to re-allocate instructions between wait station as needed to optimize the issue cycle of the consumer. Specifically, as described above, step 412 is performed by the source code first to re-allocate as many longer-latency instructions as possible from the target wait station ("for Ip in longerProducersList: if canReallocate(Ip): associatedWS.remove(Ip)"). Then steps 412 and 414 are performed together in the form of swapping any remaining longer-latency instructions in the target wait station with shorter-latency instructions in other wait stations ("else: swapAny(Ip, shorterProducersList)"). Then step 414 is performed again in the form of filling the target wait station up to its maximum capacity with any remaining shorter-latency instructions in other wait stations ("while associatedWS is not Full: while shorterProducersList is not empty: move (shorterProducersList[0], associatedWS); shorterProducersList.remove(0)"). The consumer is then linked to the wait station by associating the consumer with all producers allocated to the wait station ("consumer.waitsFor=associatedWS.getProducers(    )"). Finally, the wait station is cleared.

Figure 6:
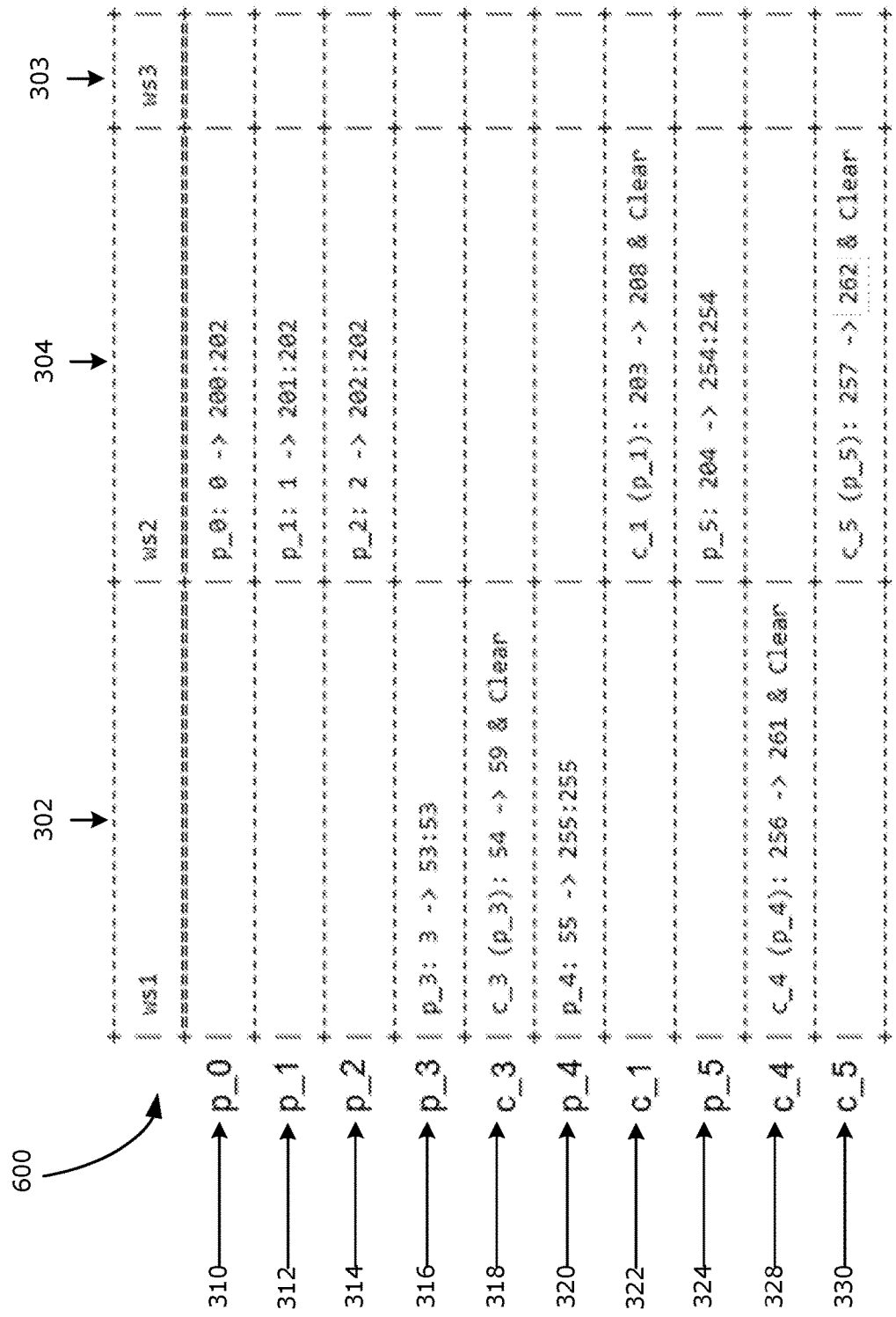
FIG. 6 is a table showing wait station allocations resulting from the first example method for wait station conflict resolution of FIG. 4 applied to the example sequence of instructions of FIG. 3A.

FIG. 6 is a table showing a wait station allocation 600 resulting from the first example method 400 for wait station conflict resolution applied to the same example sequence of instructions as FIG. 3A. In this example, when c_3 318 is processed, longer-latency instruction p_0 310 is re-allocated from ws1 to ws2 304 (at step 412) to reduce the wait station end cycle value 336 of ws1 from 200 to 53, allowing c_3 to issue at cycle 54 instead of 201. This also allows p_4 320 to be issued at cycle 55, for an end cycle value 334 of 255 instead of 402.

When c_1 322 is processed, producers p_1 312 and p_0 310 are associated with ws2 304, and dependency p_1 312 has an end cycle value of 201. This means that p_0 310 is a shorter-latency instruction because its end cycle value 334 is 200, which is before 201. So p_0 is not re-allocated away from ws2 304 at step 412. Furthermore, at step 414, p_2 314 is also identified as a shorter instruction in flight, because even though its end cycle value 334 is 202, which is 1 cycle later than 201, the variability threshold is applied (e.g., a variability threshold of 10 cycles) to classify p_2 314 as a shorter instruction. Thus, at step 414, p_2 314 is re-allocated to ws2 304, and the wait station end cycle value 336 of ws2 304 is updated from 201 to 202. This only adds one cycle of latency, which is acceptable according to the variability threshold, because it also clears p_2 314, thereby eliminating the need to clear another wait station when c_2 (not shown) is issued at cycle 206 after c_0 (also not shown) is issued at cycle 205.

When c_4 328 is processed, the wait station end cycle value 336 of ws1 302 is only 255, not 402. This allows c_4 328 to issue at cycle 256. C_5 330 is issued at cycle 257 and completes execution at cycle 262, yielding an end-to-end run-time estimate of 262 cycles for the same sequence of instructions that required 409 cycles based on the initial allocation of FIG. 3A. This represents a marked improvement in execution time due to a decreased number of stall cycles required, which also represents significant power savings.

Figure 7:
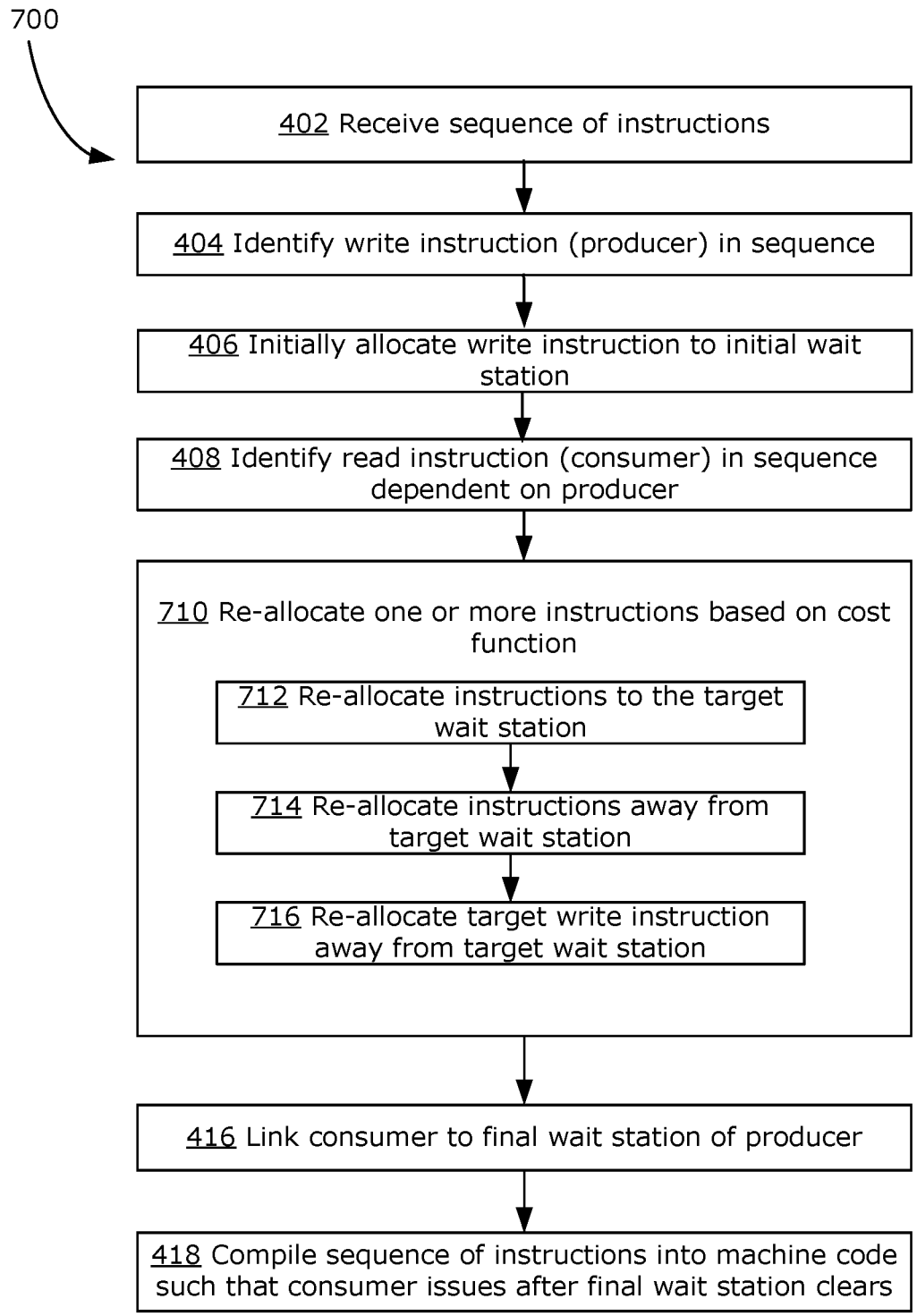
FIG. 7 is a flowchart showing steps of a second example method for wait station conflict resolution, in accordance with examples described herein.

FIG. 7 is a flowchart showing steps of a second example method 700 for wait station conflict resolution. In this second method 700, the instruction whose execution end time is optimized (i.e. the target write instruction) is the longest-latency (i.e. the longest estimated latency, e.g. "long" estimated latency category vs. "medium" or "short" estimated latency category) write instruction in flight at a given processing stage of the compiler. The longest-latency write instruction in flight may be referred to as the target write instruction, and the wait station to which the target write instruction is initially allocated may be referred to as the target wait station, in the context of method 700.

Steps 402 through 408 and 416 through 418 may be performed as in the corresponding steps of method 400.

At step 710, however, any combination of sub-steps 712, 714, and/or 716 may be performed to minimize the end cycle value 334 of the longest-latency write instruction in flight (i.e. the target write instruction).

Step 712 operates analogously to step 412: instructions may be re-allocated away from the target wait station to other wait stations if doing so would reduce the estimated end cycle value 334 of the target write instruction.

Step 714 operates analogously to step 414: instructions may be re-allocated from other wait station to the target wait station if doing so would reduce the estimated end cycle value 334 of the target write instruction.

At step 716, the target write instruction may be re-allocated to another wait station if doing so would reduce the estimated end cycle value 334 of the target write instruction.

Figure 8:
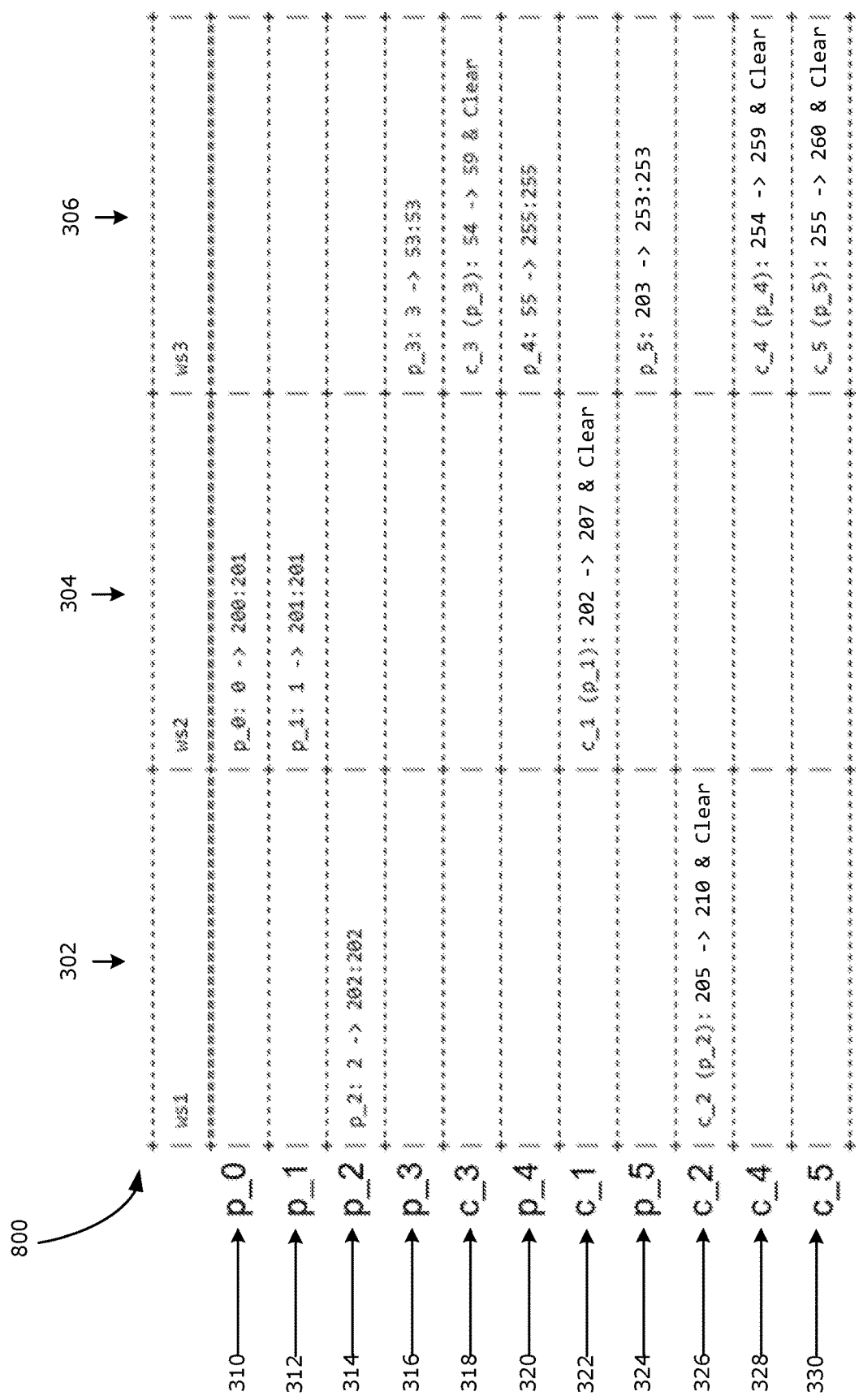
FIG. 8 is a table showing wait station allocations resulting from the second example method for wait station conflict resolution of FIG. 7 applied to the example sequence of instructions of FIG. 3A and FIG. 6.

FIG. 8 is a table showing a wait station allocation 800 resulting from the second example method 700 for wait station conflict resolution applied to the same example sequence of instructions of FIG. 3 and FIG. 6.

When the first consumer, c_3 318, is processed, several write instructions all have an estimated latency of 200 cycles (i.e. p_0 310, p_1 312, p_2 314, p_4 320, and p_5 324). In this example the method 700 selects p_2 314 as the longest-latency write instruction in flight (i.e. the target write instruction), initially allocated to ws3 306 along with write instruction p_5 324.

The corresponding consumer c_2 326 for the target write instruction p_2 314 is identified. The method 700 then re-allocates write instructions at step 710 to optimize the issue cycle of the identified consumer c_2 326. At sub-step 716, p_2 (i.e. the target write instruction) is re-allocated to its own wait station, ws1 302, to optimize the issue time of its corresponding consumer c_2. All other producers initially allocated to ws1 302 (i.e. p_0 and p_3) are re-allocated to other wait stations. The method 700 then considers whether any other producers can be re-allocated to ws1 without increasing the wait station end cycle 336 of ws1 302 and thereby increasing the stall time of c_2. In this example, this re-allocation decision may be made if either of two conditions are met: first, if the corresponding consumer is at a later position in the sequence of instructions than c_2 (in which case the issue time of c_2 will be unaffected by the later consumer), or second, if the estimated latency of the producer is close enough to the target write instruction (e.g., within a variability threshold) such that the corresponding consumer is not required to stall for a significant period of time waiting for the target write instruction to complete execution (i.e. waiting for ws1 302 to clear).

Once an optimal wait station allocation has been determined based on the longest-latency write instruction in flight, the method 700 may identify a second-longest write instruction in flight (p_1 312 in this example), and perform re-allocations to optimize the issue cycle of the corresponding consumer (c_1 322 in this example) with the constraint that no write instruction may be re-allocated to the final wait station of the longest-latency producer, i.e. ws1 302. This process may continue until all producers in flight have been optimized. The method 700 then processes the next instruction in the sequence.

The method 700 continues processing all instructions in the sequence, eventually resulting in wait station allocation 600, with an end-to-end run-time estimate of 260 cycles for the same sequence of instructions that required 409 cycles based on the initial allocation of FIG. 3A. This represents a further improvement in execution time and power savings.

The embodiments described herein may thus realize one or more advantages related to the functioning of a computer, including efficient utilization of hardware wait stations to manage data dependencies, lower software execution time and overall energy consumption due to a smaller amount of time spent stalling, and relatively efficient compilation relative to a brute-force approach. Lower energy consumption may be a particular advantage for mobile devices. The described techniques may therefore result in the improved functioning of computing hardware.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
generating machine code for execution by an in-order issue processor device having a plurality of wait stations, by using a compiler, at a compile time, to:
receive a sequence of instructions comprising:
a first write instruction; and
a current read instruction dependent on the execution of the first write instruction by the in-order issue processor device before the current read instruction can be issued for execution by the in-order issue processor device;
initially allocate the first write instruction to an initial wait station of the in-order issue processor device;
for each of one or more instructions of the sequence of instructions allocated to a wait station, re-allocate the instruction to a different wait station selected based on a cost function;
link the current read instruction to a final wait station to which the first write instruction is allocated; and
compile the sequence of instructions into the machine code, the machine code comprising an ordered sequence of processor operations such that, at a run time following the compile time, the current read instruction is issued for execution by the in-order issue processor device after all instructions allocated to the final wait station have been executed by the in-order issue processor device.

2. The method of claim 1, wherein initially allocating the first write instruction to the initial wait station comprises:
performing a round-robin initial allocation whereby the initial wait station is selected based on its position in an order of wait stations scheduled for allocation.

3. The method of claim 1, wherein initially allocating the first write instruction to the initial wait station comprises:
performing a least-occupied initial allocation whereby the initial wait station is selected based on a number of instructions allocated to the initial wait station and one or more of the other wait stations.

4. The method of claim 1, wherein initially allocating the first write instruction to the initial wait station comprises:
performing a constrained initial allocation whereby the initial wait station is selected based on characteristics of one or more instructions allocated to the initial wait station.

5. The method of claim 1, further comprising, prior to initially allocating the first write instruction to the initial wait station:
determining that each wait station of the plurality of wait stations has reached a maximum wait station capacity;
selecting a soonest-cleared wait station as the initial wait station based on an estimated clear time for each wait station, the estimated clear time indicating a latency incurred to finish execution of all instructions allocated to the wait station prior to the first write instruction; and
allocating the first write instruction to the soonest-cleared wait station,
such that the first write instruction is issued for execution by the in-order issue processor device after all instructions allocated to the soonest-cleared wait station have been executed by the in-order issue processor device.

6. The method of claim 1, wherein the cost function is calculated based on an issue time of a read instruction dependent on a target write instruction allocated to a target wait station.

7. The method of claim 6, wherein re-allocating the one or more instructions to a different wait station based on a cost function comprises:
re-allocating to the target wait station an instruction allocated to another wait station in response to determining that re-allocation of the instruction results in an updated estimated issue time for the current read instruction no more than a variability threshold later than a current issue time of the current read instruction.

8. The method of claim 6, wherein re-allocating the one or more instructions to a different wait station based on a cost function comprises:
re-allocating the target write instruction to a destination wait station, the destination wait station being a wait station other than the target wait station, in response to determining that re-allocation of the target write instruction results in an updated estimated issue time for the current read instruction at least a variability threshold sooner than a current issue time of the current read instruction.

9. The method of claim 6, wherein re-allocating the one or more instructions to a different wait station based on a cost function comprises:
re-allocating an instruction allocated to the target wait station to another wait station in response to determining that re-allocation of the instruction results in an updated estimated issue time for the current read instruction at least a variability threshold earlier than a current issue time of the current read instruction.

10. The method of claim 6, wherein:
the target write instruction is the first write instruction; and
the target wait station is the initial wait station.

11. The method of claim 10, wherein re-allocating the one or more instructions to a different wait station based on a cost function comprises:
in response to determining that at least one instruction allocated to the initial wait station has an estimated execution end time more than a variability threshold later than an execution end time of the target write instruction:
re-allocating the at least one instruction to another wait station; and
in response to determining that at least one instruction allocated to a wait station other than the initial wait station has an estimated execution end time no more than a variability threshold later than an execution end time of the target write instruction:
re-allocating to the initial wait station the at least one instruction allocated to another wait station.

12. The method of claim 6, wherein the target write instruction is a write instruction with a longer estimated latency than any other write instruction allocated to a wait station.

13. The method of claim 1, further comprising:
for each of a plurality of candidate cost functions, calculating an estimated run-time for the sequence of instructions compiled in accordance with the candidate cost function; and
selecting the cost function from the plurality of candidate cost functions based on the estimated run-time associated with each candidate cost function.

14. The method of claim 11, further comprising, prior to initially allocating the first write instruction to the initial wait station:
determining that each wait station of the plurality of wait stations has reached a maximum wait station capacity;
selecting a soonest-cleared wait station as the initial wait station based on an estimated clear time for each wait station, the estimated clear time indicating a latency incurred to finish execution of all instructions allocated to the wait station prior to the first write instruction; and
allocating the first write instruction to the soonest-cleared wait station,
such that the first write instruction is issued for execution by the in-order issue processor device after all instructions allocated to the soonest-cleared wait station have been executed by the in-order issue processor device.

15. The method of claim 12, further comprising, prior to initially allocating the first write instruction to the initial wait station:
determining that each wait station of the plurality of wait stations has reached a maximum wait station capacity;
selecting a soonest-cleared wait station as the initial wait station based on an estimated clear time for each wait station, the estimated clear time indicating a latency incurred to finish execution of all instructions allocated to the wait station prior to the write instruction; and
allocating the first write instruction to the soonest-cleared wait station,
such that the first write instruction is issued for execution by the in-order issue processor device after all instructions allocated to the soonest-cleared wait station have been executed by the in-order issue processor device.

16. A device, comprising:
one or more processor devices; and
a memory storing instructions which, when executed by the one or more processor devices, cause the device to compile a sequence of instructions into machine code according to the method of claim 1.

17. A device, comprising:
an in-order issue processor device; and
a memory storing machine code compiled in accordance with the method of claim 1.

18. The device of claim 17, wherein an instruction of the machine code allocated to a wait station comprises a binary sequence including a wait station identifier identifying the wait station to which the instruction is allocated.

19. The device of claim 18, wherein the in-order issue processor device includes, for each wait station, a counter register storing a counter value indicating a number of pending instructions allocated to the wait station.

20. A non-transitory processor-readable medium having instructions tangibly stored thereon, wherein the instructions comprise machine code compiled in accordance with method 1.

* * * * *